(12) United States Patent
Sleator

(10) Patent No.: US 7,102,616 B1
(45) Date of Patent: Sep. 5, 2006

(54) REMOTE CONTROL DEVICE WITH POINTING CAPACITY

(75) Inventor: Michael G. Sleator, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/263,374

(22) Filed: Mar. 5, 1999

(51) Int. Cl.
*G09G 5/08* (2006.01)

(52) U.S. Cl. .................... 345/158; 345/156; 345/157
(58) Field of Classification Search ........ 345/156–163; 250/340
See application file for complete search history.

(56) References Cited

U.S. PATENT DOCUMENTS

| | | | | |
|---|---|---|---|---|
| 5,280,275 A | * | 1/1994 | Kaplan | 345/163 |
| 5,574,479 A | * | 11/1996 | Odell | 345/158 |
| 5,694,153 A | | 12/1997 | Aoyagi et al. | 345/161 |
| 5,892,501 A | * | 4/1999 | Kim et al. | 345/158 |
| 5,926,168 A | * | 7/1999 | Fan | 345/158 |
| 5,929,444 A | * | 7/1999 | Leichner | 250/340 |
| 6,014,129 A | * | 1/2000 | Umeda et al. | 345/158 |

\* cited by examiner

*Primary Examiner*—Bipin Shalwala
*Assistant Examiner*—David L. Lewis
(74) *Attorney, Agent, or Firm*—Workman Nydegger

(57) ABSTRACT

A hand held remote control device that allows a user to select the position and movement of a cursor on a display screen or other selected functions by rotating or translating the input device in three-dimensional space. A signal is emitted from a beacon at a first location and is received by the remote control device at a second location. The remote control device detects, about two non-parallel axes, components of an angular displacement between the incident direction of the signal and a selected axis of the remote control device. Optical structures, such as cylindrical lenses, are used to project portions of the signal onto detectors in order to measure the angular displacement. Information corresponding to the detected angular displacement is transmitted to a control box, which controls the position and movement of the cursor on the display screen in response to the transmitted information.

42 Claims, 12 Drawing Sheets

REMOTE CONTROL DEVICE WITH POINTING CAPACITY

BACKGROUND OF THE INVENTION

1. The Field of the Invention

The present invention relates to input devices for controlling the position of a cursor or the selection of information on a display screen. In particular, the present invention relates to a hand held remote control device that transmits data corresponding to its angular orientation to a processor, which in turn controls the position of a cursor in response to the transmitted data.

2. The Prior State of the Art

There have been developed many devices for allowing a user to interactively control the position of a cursor and to otherwise manipulate the display of information on computer display screens and the like. In general, these input devices function by transmitting data from the input device to a computer processor where the data is used to position a cursor on a display screen. Typically, input devices detect changes in their physical positioning or forces applied thereto by a user, which is then translated into changes in the position or velocity of a computer generated object on a display screen. Such manipulable input devices provide advantages over buttons such as those found in keyboards, in that the input devices frequently allow the user greater freedom to easily select information on a display screen.

A computer mouse is one example of an input device that has found widespread acceptance for positioning a cursor on a computer display screen. A mouse typically includes a freely rotatable ball partially encased in a housing so that the ball may be rolled over a flat surface. Sensors in the housing detect the rotation of the ball and transmit rotation information to the computer processor where it is converted into corresponding movement of the cursor. Computer mice have the advantage of allowing a user to precisely and easily position a cursor at a desired location on a computer display screen. Moreover, the relationship between movement of a mouse and corresponding movement of a cursor is relatively intuitive so that use of a mouse is easily learned.

Joysticks are another type of commonly used input devices in computer systems. A joystick typically includes a shaft-like handle that protrudes from a base and that may be easily gripped by the user. Force is applied onto the handle in one of any number of possible directions that are generally parallel to the horizontal plane. Sensors in the base of the joystick detect a direction and, optionally, the magnitude of the applied force, and transform this information into a corresponding response on the display screen. Joysticks are most widely used in computer applications where selection of direction is desired. For example, joysticks are especially useful in many computer games in order to select a direction of movement and, optionally, velocity of a computer generated object.

There have been developed many other computer input devices, including variations on computer mice and joysticks. For example, trackballs include a rotatable ball that is directly exposed so that it may be directly manipulated by the fingers or hands of a user. A touchpad includes a planar surface having sensors for detecting the positioning of a pointing device thereon and for transmitting this information to a computer processor. Furthermore, some computer input devices have been developed for representing three dimensional translation and/or rotational motion. In general, computer input devices convert physical displacement or applied forces to corresponding direction, position, or velocity of a computer generated object.

In recent years, interactive systems that use conventional television screens to display computer-generated or processed information have become increasingly common. For example, there are computer systems having Internet browsers that are adapted for use with conventional television screens. Moreover, one clear trend in the industry is the increasing integration of cable television, the Internet, other computer applications, and other information systems, whereby vast amounts of information may be instantaneously made available to a user. These systems require interaction between the user and a visual display, such as selection from among various menu options displayed on the television screen.

Frequently, interactive information systems displayed on a television screen are used in physical environments that are significantly different from the typical setting in which personal computers are used. For example, interactive information systems are often used in a living room setting where the user may be located on an opposite side of the room from the television screen. In addition, the user is ordinarily not seated at a table or a desk as is common for personal computer users. For this reason, the conventional practice of using a desktop keyboard and mouse for personal computers is not readily transferable to television-based interactive information systems. It can be easily understood that without an available flat surface, the use of a computer mouse is difficult or inappropriate in a living room setting.

As previously mentioned, one of the most promising uses for television-based interactive information systems is to provide Internet access on a conventional television screen. Perhaps the most common method for selecting information on the Internet is to control the position of the cursor with relation to a World Wide Web (Web) page. Because the use of a computer mouse is awkward, one solution has been to replace the cursor with a selection box that can be moved from one active are of a Web page to another by using directional arrow buttons. Under ideal conditions, directional arrow buttons work well and provide some benefits. In particular, the hardware is very simple and inexpensive and the directional arrow model is easily understandable even by very computer naive users. However, the directional arrow model fails when the Web page contains a Hypertext Markup Language (HTML) map which generally requires an actual pointing operation. In the past, the directional arrow model adapts to HTML maps by reverting to an arrow key driven cursor mode, which is functional but slow and cumbersome. There are also many cases where the directional arrow model breaks down. For example, orthogonal move instructions are ambiguous when adjacent active areas on a Web page are positioned diagonally one with another.

In addition to the foregoing difficulties that arise in basic Web page navigation using the directional arrow model, this model is not readily adaptable to other common and potential desirable activities and input modes. For example, directional arrow buttons are not adequate for real time interaction required for many computer games. Likewise, they are entirely impractical for drawing. In some cases, the directional arrow model is basically sound, but the vast number of locations to be traversed limit its practicability Another factor that limits the types of input devices that can be practically used in television-based interactive systems is cost constraints. A primary reason why television-based Internet systems have become well accepted by consumers is the cost advantages they provide over personal computers. A typical television-based Internet system is primarily dedicated to providing interactive information on a television screen, thereby allowing the elimination or the reduction in size and cost of many of the components found in conventional personal computers. For example, because television-based Internet systems may not be intended for use with a wide number of computer applications, their hard drive requirements may be much less than those of personal computers. Moreover, the processing requirements are often different, which may allow television-based Internet systems to use processors that are less expensive than those of personal computers. Furthermore, users of television-based Internet systems usually do not purchase a dedicated monitor, but instead use an existing television screen.

It has been found that many consumers readily accept the Internet-dedicated nature of television-based Internet systems because of the vast cost savings compared to conventional personal computers. If a very expensive input device were to be sold with television-based Internet systems, a portion of the foregoing savings could be lost.

In view of the foregoing, it would be desirable to have an input device that can suitably allow a user to select a position of cursor on a conventional television screen. For example, it would be advantageous to provide an input device that allows a user to accurately position a cursor on a display screen in a living room environment. It would also be desirable to have an input device for positioning a cursor that is also relatively inexpensive.

SUMMARY AND OBJECTS OF THE INVENTION

The present invention relates to input devices for controlling the position of a cursor or the selection of information on a display screen. In particular, the present invention relates to a hand held remote control device that transmits data corresponding to its angular orientation to a processor, which in turn controls the position of a cursor in response to the transmitted data.

A user positions a cursor on a display screen by manually moving or rotating the remote control device. As the remote control device moves, data is transmitted to a control box that generates proportional movement of the cursor. Moving the remote control device to move a cursor is conceptually similar to a simple pointing gesture or to the manner in which a laser-pointing device projects a point of light on a wall.

In one application of the present invention, the remote control device is used in combination with a conventional television screen or another display screen and a set top control box that includes a processor for controlling the display of information on the television screen. In addition, the remote control device is preferably used with a beacon that emits a signal consisting of electromagnetic radiation selected, for example, from the infrared or radio frequency regions of the spectrum. The angular orientation of the remote control device is determined by sensors in the remote control device that detect information relating to the incident direction of the signal that is removed by the remote control device. In effect, the sensors measure the angular displacement between a selected axis of the remote control device and the incident direction of the signal. Accordingly, the invention extends to any input device that receives an electromagnetic signal from a distant source, determines angular orientation information from the electromagnetic signal, and makes this information available for the generation of a selected function on a display screen. In one method of measuring the angular displacement, the remote control device continually receives the signal from the beacon and measures, about two non-parallel axes, the angular displacement between the incident direction of the signal and the selected axis of the remote control device. The method may include, for example, projecting the signal through two cylindrical lenses each having a cylindrical axis parallel to the one of the two axes about which the angular displacement is measured.

The remote control device transmits information corresponding to the measured angular displacement to the television-based Internet system. The transmitted information may include raw data generated by the detectors or may include data that has already been processed by the remote control device. In either case, the angular displacement information may be used to determine the movement of a cursor on the display screen.

There may be several suitable methods for using the hand held remote control device to move the cursor. The first step generally includes activating the remote control device. This may be done by the user depressing a button on the remote control device, by pointing the remote control device at the beacon or another preselected region, or by any other suitable means. When the active state is selected, the processor in the television-based Internet system selects an initial position of the cursor in one of at least two possible ways. First, the cursor may be automatically set to the center of the screen or any other predetermined position. Alternatively, the cursor may be set at its last position on the display screen before the remote control device was previously deactivated. The initial position sets a baseline from which subsequent movement of the remote control device is measured. Second, the initial cursor position may be specified by the initial angular orientation of the remote control device. In this case, the remote control device makes an initial angular orientation measurement and relays the associated information to the control box.

After the initial postion of the cursor is set, the processor in the control box can move the cursor according to one of at least two methods. In the first method, the initial orientation of the remote control device is stored in the memory of the processor. Any subsequent displacement of the remote control device is compared to the original angular orientation, and the cursor is moved from its original position proportionally or according to any other desired mapping function. In the second method, each successive set of angular orientation information received by the control box is stored in the memory, and forms the baseline to which the following angular measurement is compared. For example, each time angular orientation information is related to the processor, the information is compared to the immediately preceding set of data. After the successive sets of data are compared, the cursor is moved from its then-current position to a new position according to the mapping function.

Because the remote control devices of the invention are often held in a user's hand and moved manually by the user, the movement of the remote control device and the corresponding angular orientation information unavoidably includes irregularities caused by shakiness, jittering, and the inherent inability to manually hold and move an object through a precisely predetermined path. Various filtering and sampling techniques may be used to at least partially reduce or prevent the irregular movement from translating into jumpy or shaky movement of the cursor.

The electromagnetic signal generated by the beacon may be amplitude modulated so that the remote control device may distinguish the signal from background sources. In addition, information may be encoded in the signal and may be extracted by a demodulator in the remote control device.

It can be appreciated that the remote control device and the accompanying system of the present invention overcome the limitations of the prior art. In particular, the remote control device is a pointing input device that can be used to specify the position of a cursor on a display screen. The present invention may be used to easily position a cursor on a television screen in a living room environment or in other situations where using a conventional computer mouse is impractical. Moreover, the sensors of the input device are relatively simple and may be incorporated in a standard remote control device at minimal additional cost, thereby making the invention cost effective in many situations.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope.

The present invention is directed to input devices used to select the position of a cursor or to select another function on a display screen by manually pointing, rotating, and moving the input device in three-dimensional space. In one embodiment of the invention, an electromagnetic signal is emitted from a distant location and is received by the remote control device. The signal has an incident direction as it is received by the remote control device. Changes in the angular displacement between a selected axis of the remote control device and the incident direction are detected and transmitted to a processor in a control box. The transmitted information is used to select and move the position of a cursor on the display screen or to generate another selected function.

It will be understood that the remote control device of the present invention may be used in connection with a wide variety of display screens and visual display systems, including interactive information systems. For example, the remote control device may be used with personal computers, multimedia presentations, video and computer games, and the like. It has been found that the remote control devices of the present invention are particularly useful in interactive information systems using a conventional television screen. For example, the remote control device may be used to select the position of a cursor on a Web page or another Internet application that is displayed on a television screen. It should be understood that the specific embodiments disclosed herein directed to interactive information systems using a conventional television screen are presented by way of example and not by limitation.

In one embodiment of the invention, the remote control devices are used in a system known as WebTV™ (WebTV), which uses a conventional television screen for displaying information and browsing the Web, and which uses standard telephone lines, Integrated Services Digital Network (ISDN) lines, or the like to connect to the Internet or other wide area networks.

Figure 1:
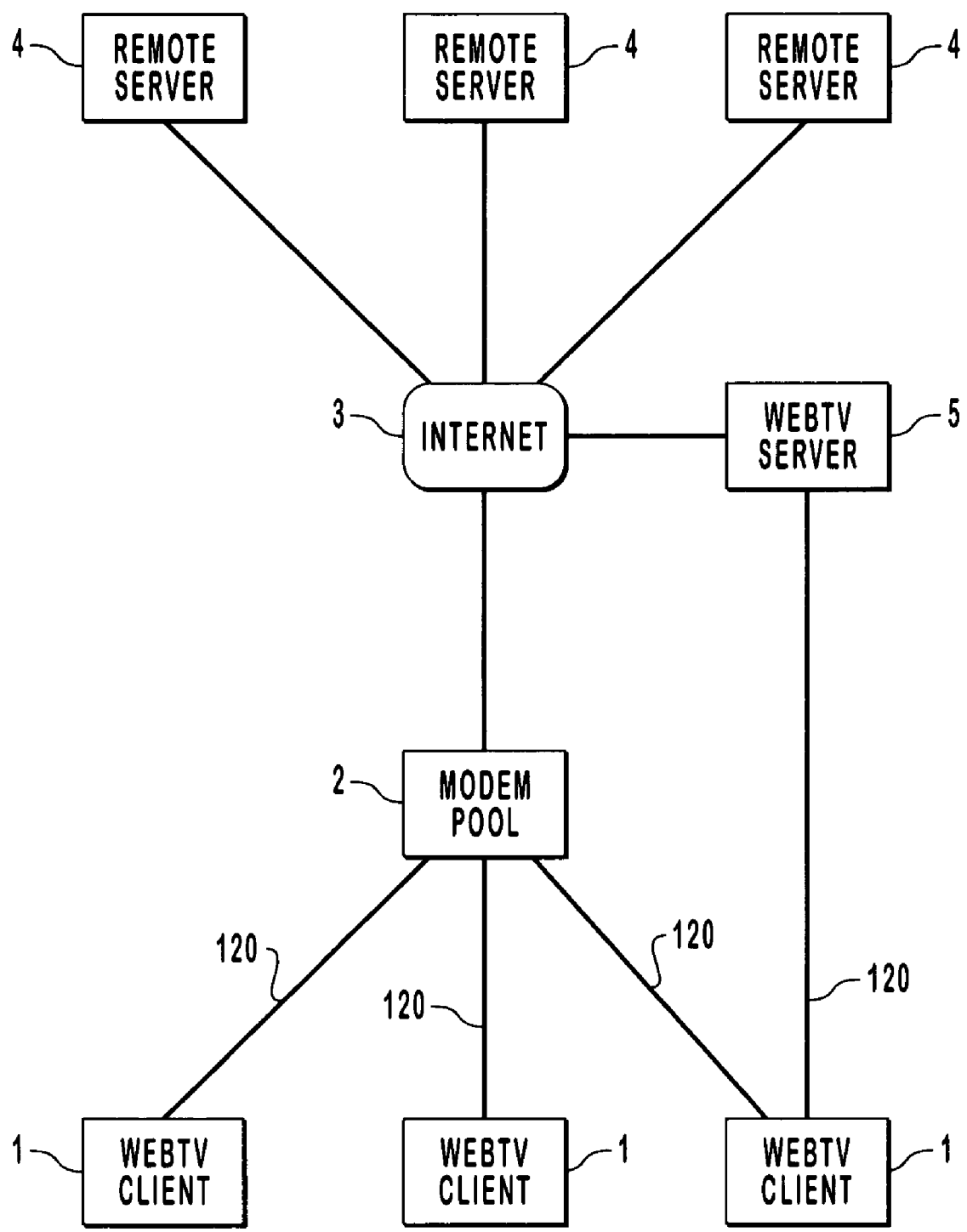
FIG. 1 is a schematic diagram of selected components of a wide-area network that may be used in conjunction with the invention.

FIG. 1 illustrates a configuration of a WebTV network according to one embodiment. Multiple WebTV clients 1 communicate with a modem pool 2 by means of direct-dial, bi-directional data connections 120, which may be telephone lines, ISDN connections, or any other suitable communications channel. Modem pool 2 may be any conventional modem pool, such as those that are currently used for providing access to the Internet and other wide area networks. For example, modem pool 2 may be provided by a local Internet Service Provider (ISP). Thus, modem pool 2 may be coupled to a number of remote servers 4 via a conventional network infrastructure 3, such as the Internet. In addition, a WebTV system may be also supported by a WebTV server 5, which is dedicated to providing information specifically to WebTV clients 1. Accordingly, a WebTV client 1 may use telephone or ISDN connections to communicate with either modem pool 2 or WebTV server 5.

Figure 2:
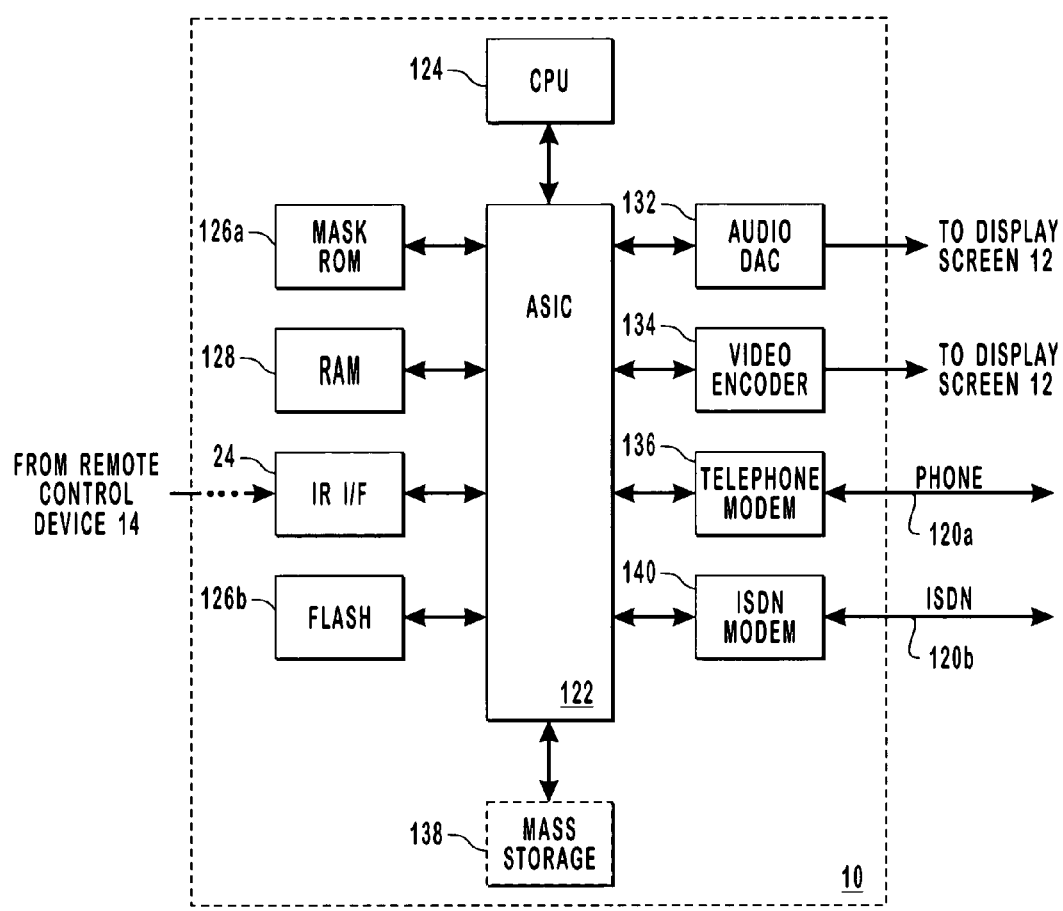
FIG. 2 is a schematic diagram of selected components of a control box of an interactive information system that may be used in conjunction with the invention.

The architecture of a control box of a WebTV client is illustrated in FIG. 2. Control box 10 may be either a self-contained unit or built into a television set. Control box 10 uses hardware and software for providing the user with a graphical user interface, by which the user can access the WebTV network services, browse the Internet, send and receive e-mail, and otherwise access the Internet.

Operation of the WebTV client system is controlled by a Central Processing Unit (CPU) 124, which is coupled to an Application-Specific Integrated Circuit (ASIC) 122. CPU 124 executes software designed to implement features of the WebTV client system, including some of the features of the present invention. ASIC 122 contains circuitry which is used to implement certain functions of the WebTV client system. ASIC 122 is coupled to an audio digital-to-analog converter 132 and to a video encoder 134, which provide audio and video output, respectively, to display screen 12 (seen in FIG. 3A). An IR interface 24 detects IR signals transmitted by remote control device 14 (seen in FIG. 3A) and, in response, provides corresponding electrical signals to ASIC 122. Alternatively, the signals transmitted by remote control device 14 may be selected from another suitable region of the spectrum. A standard telephone modem 136 and an ISDN modem 140 are coupled to ASIC 122 to provide connections 120a and 120b, respectively, to modem pool 2 and, via the Internet 3, to remote servers 4. While the system illustrated in FIG. 2 includes both a telephone modem and an ISDN modem, either one of these devices is sufficient to support a WebTV client system. Furthermore, in other embodiments of a WebTV client system, modems 136 and 140 may be supplemented or replaced with a cable television modem or another suitable communications device. In addition, communication with server 5 may instead be established using a token ring or Ethernet connection.

Also coupled to ASIC 122 is a mask Read-Only Memory (ROM) 126a, a flash memory 126b, and a Random Access Memory (RAM) 128. Mask ROM 126a is non-programmable and provides storage of program instructions and data. Flash memory 126b may be a conventional flash memory device that can be programmed and erased electronically. Flash memory 126b provides storage of the browser software as well as data. In one embodiment, a mass storage device 138 is included in control box 10 and coupled to ASIC 122. The mass storage device 138 may be used to input software or data to the client or to download software or data received over network connection 120a or 120b. Mass storage device 138 may included any suitable medium for storing computer-executable code, such as magnetic disks, optical disks, and the like.

One use for the above-described components of control box 10 is to support and execute applications software including a Web browser. In particular, the applications software typically includes computer-executable code for responding to data received from the remote control device and for generating and moving a cursor on the display screen. Thus, control box 10 is but one example of processing means for receiving data from the remote control devices of the invention and for generating a cursor in response to the data.

The application software and associated operating system software are stored in flash memory 126b, or instead may be stored in any other suitable memory device, such as mask ROM 126a or mass storage device 138. The computer-executable instructions that, according to one embodiment of the invention, are used to control a cursor on a display screen and to otherwise display information are executed by CPU 124. In particular, CPU 124 executes sequences of instructions contained in one or more of mask ROM 126a, flash memory 126b, and RAM 128 to perform certain steps of the present invention that will be more specifically disclosed hereinafter.

Figure 3B:
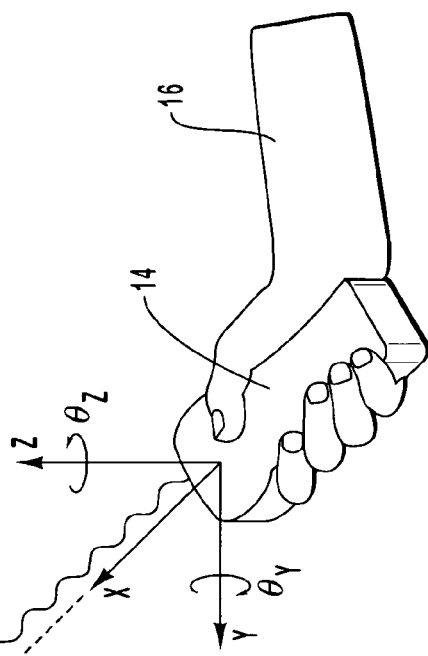
FIG. 3B depicts an example of a coordinate reference frame that may be used to describe the operation of the remote control devices of the invention.
Figure 3A:
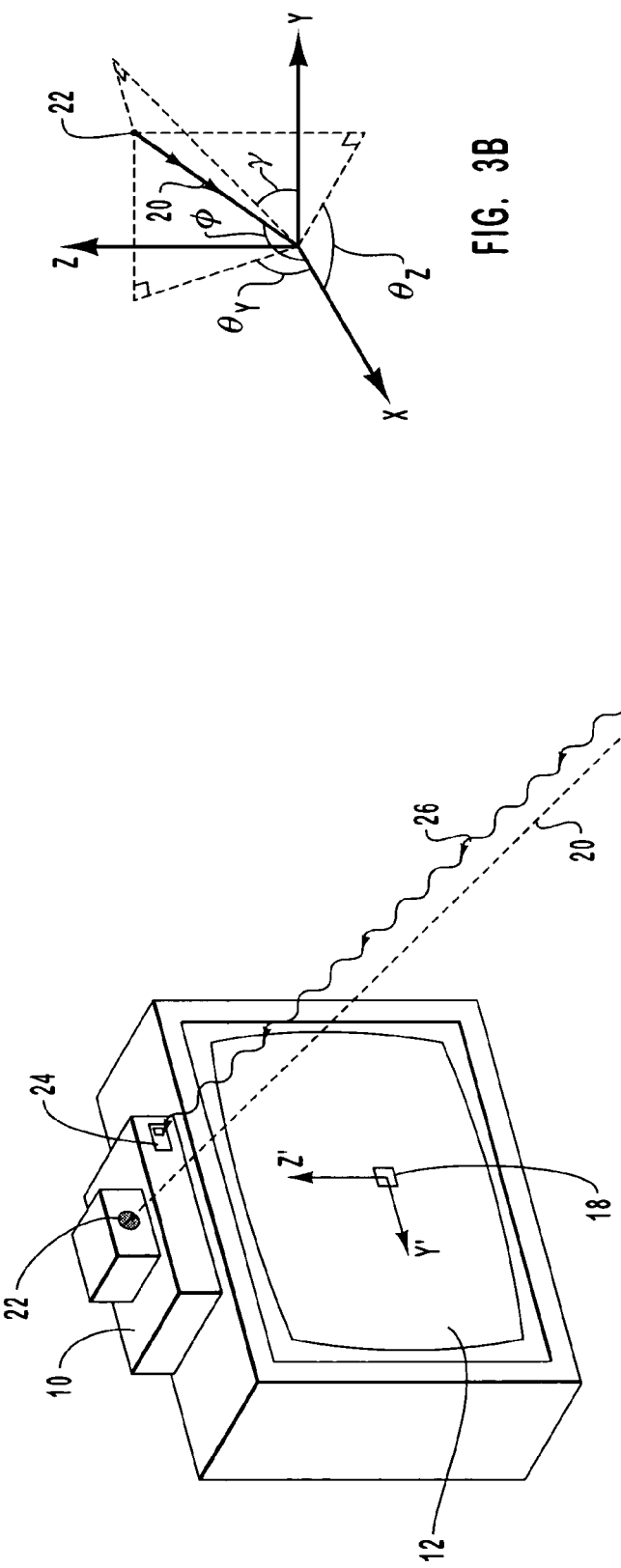
FIG. 3A is a perspective view of a visual display system including a display screen, a control box, a signal beacon, and a hand held remote control device.

FIG. 3A depicts but one example of the physical configuration of the elements of a client portion of a WebTV system or another preferred interactive information system and the general manner in which movement of a remote control device is linked to corresponding movement of a cursor. Control box 10 may include the components illustrated in FIG. 2 and is ordinarily positioned in the line of sight of a user 16. Control box 10 is often placed on or near a television set that includes display screen 12 so that the action of pointing remote control device 14 at control box 10 is at least roughly equivalent to pointing remote control device 14 at display screen 12. However, control box 10 may instead positioned at a separate location from display screen 12.

Remote control device 14 allows user 16 to communicate information to control box 10 from a remote location. For example, remote control device 14 may allow a user 16 to be seated at an opposite side of a room from display screen 12. Remote control device 14 may be a device specifically dedicated for the cursor-positioning functions disclosed herein or instead may be a multifunction device that supplies other information to control box 10. Indeed, remote control device 14 may be a conventional remote control device that has been adapted to perform the cursor-positioning functions disclosed herein.

The angular orientation and the angular movement of remote control device 14 are used to position and move a cursor 18 on display screen 12 or to generate any other selected function on display screen 12. Examples of other selected functions include drawing, scrolling a computer-generated page, and identifying a menu selection, among any number of alternatives.

According to one embodiment of the invention, the angular orientation and movement of remote control device 14 are determined by using a signal 20 generated by a beacon 22. Signal 20 may consist of electromagnetic radiation primarily from the infrared region of the spectrum. Alternatively, the electromagnetic radiation of signal 20 may be selected from the radio frequency or any other suitable region of the spectrum. For purposes of illustration, FIG. 3A depicts signal 20 traveling from beacon 22 to remote control device 14. However, it is to be understood that beacon 22 emits signal 20 in all directions that are within the line of sight of beacon 22. Depending on the environment, in order to detect the angular orientation of remote control device 14 with respect to beacon 22, signal 20 may need to be distinguished by remote control device 14 from background sources of radiation. Accordingly, signal 20 may be amplitude modulated by methods known in the art.

Remote control device 14 communicates with control box 10 by means of electromagnetic signals selected from the infrared region of the spectrum or alternatively from the radio frequency or other suitable region of the spectrum. Control box 10 includes a receiver 24 that detects the transmitted data 26 sent from remote control device 14. Methods of transmitting data from a remote control device to a set top box using infrared or other electromagnetic signals are well known in the art.

FIG. 3A also depicts an example coordinate reference frame for remote control device 14 in order that the coordination of movement between remote control device 14 and cursor 18 may be further described and understood. The origin of the coordinate frame is defined to be at a known location with respect to remote control device 14. Such known location may be, for example, within or near remote control device 14. As another example, the origin may be at or near a location that detects signal 20. The X axis is herein defined to be coaxial with the central axis of remote control device 14. Furthermore, the Y axis and the Z axis each extends from the origin at right angles relative to the other axes. The foregoing coordinate reference frame is herein defined to be fixed with reference to remote control device 14. In particular, rotation or translation of remote control device 14 is accompanied by corresponding rotation or translation of the coordinate reference frame. Other coordinate reference frames may be used and the coordinate reference frame of FIG. 3A is provided simply by way of example.

FIG. 3A depicts an X axis that passes through beacon 22, a horizontal Y axis, and a vertical Z axis. It should be understood, however, that the coordinate reference frame and the directions of the respective axes are arbitrary, and that the operation of the remote control device could be equally described with respect to other coordinate reference frames. For example, the X axis does not need to be aligned with the central axis of remote control device 14, but instead may be any other selected axis of remote control device 14. In addition, non-orthogonal coordinate frames may also be used.

Cursor 18 is positioned on display screen 12, which is defined herein to include a secondary coordinate system. In particular, if display screen 12 is oriented along a horizontal plane, the Y' axis is defined as being horizontal and the Z' axis is defined as being vertical as depicted in FIG. 3A. Again, this coordinate frame is presented by way of example, and not by limitation.

Signal 20 is received by remote control device 14 at or near the origin of the coordinate reference frame. Accordingly, signal 20 has an incident direction at remote control device 14 that may be defined relative to the coordinate reference frame. In the example illustrated in FIG. 3A, the incident direction of signal 20 is substantially parallel to the X axis, and is but one example of the incident directions that are possible.

As remote control device 14 is rotated or translated, the incident direction of signal 20 generally changes with respect to the coordinate reference frame. Remote control device 14 detects the angular displacement between a selected axis of remote control device 14, which in this example is collinear with the X axis, and the incident direction of signal 20. As used herein, "angular displacement" may have a value of zero if the incident direction of signal 20 is parallel to the selected axis. It should also be noted that the measurements made by the remote control device could be accurately and interchangeably described as specifying the "incident direction" of signal 20, the "angular displacement" between the selected axis of the remote control device and the incident direction of signal 20, or the "angular orientation" of remote control device 14.

Data corresponding to the detected angular displacement is transmitted to control box 10, where it is translated into movement of cursor 18 according to a preselected mapping function. For example, a mapping function may include a scale factor of a selected value that proportionally links rotation of the remote control device through a certain angle to corresponding movement of the cursor through a specified distance.

As seen in FIG. 3A, rotation of remote control device 14 in the XY plane and about the Z axis produces an angular displacement of the incident direction of signal 20 about the Z axis. In one example of a mapping function that may be used according to the invention, control box 10 translates the foregoing rotation into movement of cursor 18 in the Y' axis. Likewise, rotation of remote control device 14 in the XZ plane and about the Y axis may result in movement of the cursor 18 in the Z' direction. However, the mapping function may instead translate movement of remote control device 14 into movement of cursor 18 according to any other desired relationship.

The mapping function may be advantageously adjusted as desired such that rotation of remote control device 14 through a given amount may result in either a relatively small or relatively large displacement of cursor 18. For example, the scale factor that correlates the relative movement of remote control device 14 and cursor 18 may be selected by the user after experimentation so that cursor 18 responds in a comfortable manner.

The mapping functions used with the invention may have any desired level of complexity. The mapping function may be dynamically modified according to the particular task a user is performing or the particular region of the display screen at which the cursor is located. For example, in a text-editing window, it is sometimes difficult to extend a text selection within a horizontal line without unintentionally slipping the cursor into an adjacent line above or below. This difficulty can be reduced by modifying the vertical scaling independent of the horizontal scaling when a user enters a text editing mode. Of course, other modifications of the mapping functions may be desirable, and are encompassed by the invention.

The remote control devices 14 of the invention are generally capable of detecting the incident direction of signal 20 about two nonparallel axes. As shown in FIG. 3B, the apparent position of beacon 22 may be uniquely specified by defining a coordinate reference frame and by identifying components of the incident direction of signal 20 about two nonparallel axes. It should be noted that the apparent position of beacon 22 includes not only the incident angle $\phi$, but also the declination $\gamma$ of beacon 22 as measured about the X axis. An apparent position of beacon 22 that is specified by $\phi$ and $\gamma$ is also uniquely specified by angle $\theta_Y$ measured about the Y axis and angle $\theta_Z$ measured about the Z axis. To further illustrate, angle $\theta_Y$ may be identified by performing a normal projection of beacon 22 and signal 20 onto the XZ plane and measuring the resulting angle $\theta_Y$. Likewise, angle $\theta_Z$ may be identified by performing a normal projection of beacon 22 and signal 20 onto the XY plane and by measuring the resulting angle $\theta_Z$. Other coordinate frames can be used with the invention, and may use different metrics to describe the incident angle.

The foregoing observation is important because these principles may be used to position and configure the sensors in remote control devices according to one embodiment of the invention. It should also be noted that while the X, Y, and Z axes of FIG. 3B are mutually orthogonal, an apparent position of beacon 22 can be uniquely specified so long as the axes about which angles $\theta_Y$ and $\theta_Z$ are measured are nonparallel one to another.

In order to detect angles $\theta_Y$ and $\theta_Z$ of FIG. 3B, an embodiment of the remote control devices of the invention includes means for selectively projecting and/or focusing a portion of signal 20 onto a surface of the remote control device so that rotation about the Y and the Z axes may be measured. Such means may be optical in nature when signal 20 is an infrared or other optical signal. RF signals will require different means. Although the example given below uses infrared or other optical signals to illustrate the operation of the invention, similar principles apply to other types of signals.

In view of the foregoing discussion and the embodiment depicted in FIGS. 3A and 3B, it can it can be understood that if a user were to rotate the remote control device 14 of FIG. 3A about its central axis, or equivalently about the X axis, subsequent movement of the remote control device in the horizontal plane generally would not result in horizontal movement of cursor 18. This feature of one embodiment of the invention is further illustrated in FIG. 12A, which shows remote control device 14 and the system of FIG. 3A from the perspective of a user of the system. In particular, remote control device 14 has been rotated about it central axis, thereby offsetting the Z axis and the Y axis from the vertical and horizontal planes, respectively. When remote control device 14 is rotated in the horizontal plane as shown at reference number 19 in FIG. 12A, the resulting motion 21 of cursor 18 is generally diagonal across display screen 12. Likewise, vertical motion of remote control device 14 results in diagonal movement of cursor 18.

Figure 12A:
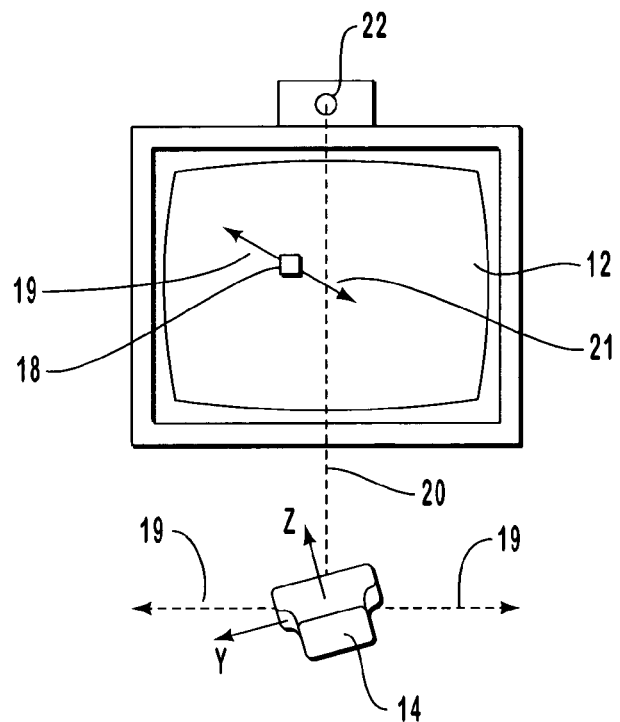
FIG. 12A is a perspective view of the visual display system of FIG. 3A, depicting the response of the cursor when the remote control device is rotated about its central axis.
Figure 12B:
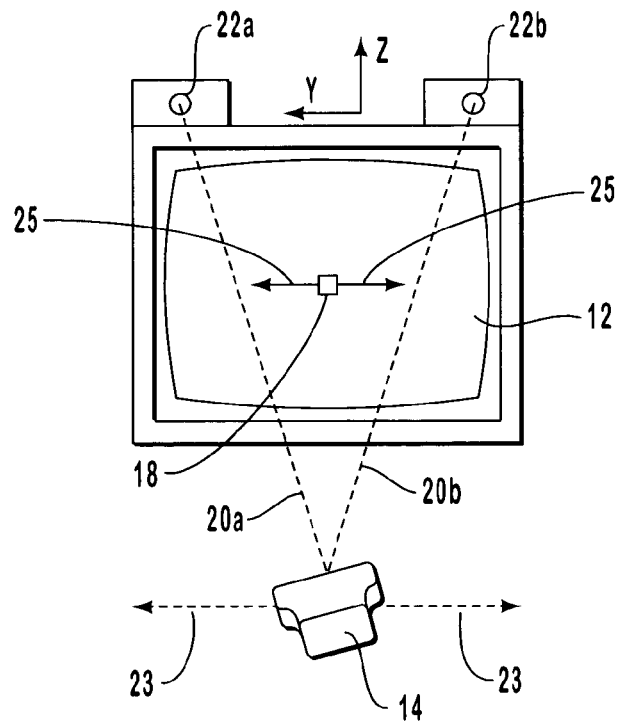
FIG. 12B is a perspective view of an embodiment of a visual display system using two beacons, and further shows the response of the cursor when the remote control device is rotated about its central axis.

While the above-described response of the remote control device to rotation about its central axis is entirely acceptable, and often preferable, some users in some situations may prefer an alternative embodiment, illustrated in FIG. 12B. Remote control device 14 of FIG. 12B and the associated system are modified such that the coordinate reference frame may be described as being fixed with respect to display screen 12. In this embodiment, two (or more) beacons are positioned in a known spatial relationship one with another. For example, beacons 22a and 22b, which emit signals 20a and 20b, respectively, are positioned near display screen 12. The remote control device 14 separately monitors the apparent position of beacons 22a and 22b by differentiating between the signals that are emitted from each of the beacons. The differentiation may be accomplished, for example, by alternatingly activating beacon 22a and beacon 22b or by modulating the beacon signals at different frequencies or at offset frequencies.

By specifying and comparing the apparent position of beacons 22a and 22b, the system of the invention identifies the horizontal plane or any other reference plane that is fixed with respect to the two beacons. Thus, as remote control device 14 undergoes rotation about its central axis, the system of this embodiment is able to continue to monitor the relative position of the horizontal plane or the other reference plane. Using the positional information relating to beacons 22a and 22b, the system compensates for rotation of remote control device about its central axis as desired.

Accordingly, the embodiment of FIG. 12B allows the cursor to respond to motion of remote control device 14 in the manner illustrated. In particular, motion 23 of remote control device 14 in the horizontal plane may be translated into horizontal movement 25 of cursor 18. Of course, in the alternative, the dual beacon system of FIG. 12B is also capable of controlling motion of the cursor as depicted in FIG. 12A.

In the embodiment illustrated in FIG. 12B, beacons 22a and 22b do not need to be positioned in the same elevation, but instead may be positioned relative one to another in substantially any axis or plane. Moreover, this embodiment supports another optional feature, in which the system monitors the angle subtended, from the point of view of remote control device 14, by beacons 22a and 22b. Because beacons 22a and 22b are positioned in a known relationship with respect to display screen 12, the angle subtended by the two beacons can be used to calculate the angle subtended by the display screen. This information may then be used to adjust the mapping function that translates motion of remote control device 14 into movement of cursor 18. For example, the scale factor that is used according to one implementation of the invention to convert a given angular motion of remote control device 14 into a linear motion of cursor 18 of a particular distance may be adjusted based on the angle subtended by the display screen 12. As a result, regardless of the distance of the user from display screen 12, cursor 18 responds to motion of remote control device 14 in a comfortable manner, without requiring excessive hand or arm motion by the user. Such automatic adjustment of the scale factor eliminates a calibration operation, used in other implementations of the invention, which requires the user to adjust the response of the cursor to a comfortable level, depending on the distance of the user from the display screen.

Figure 4:
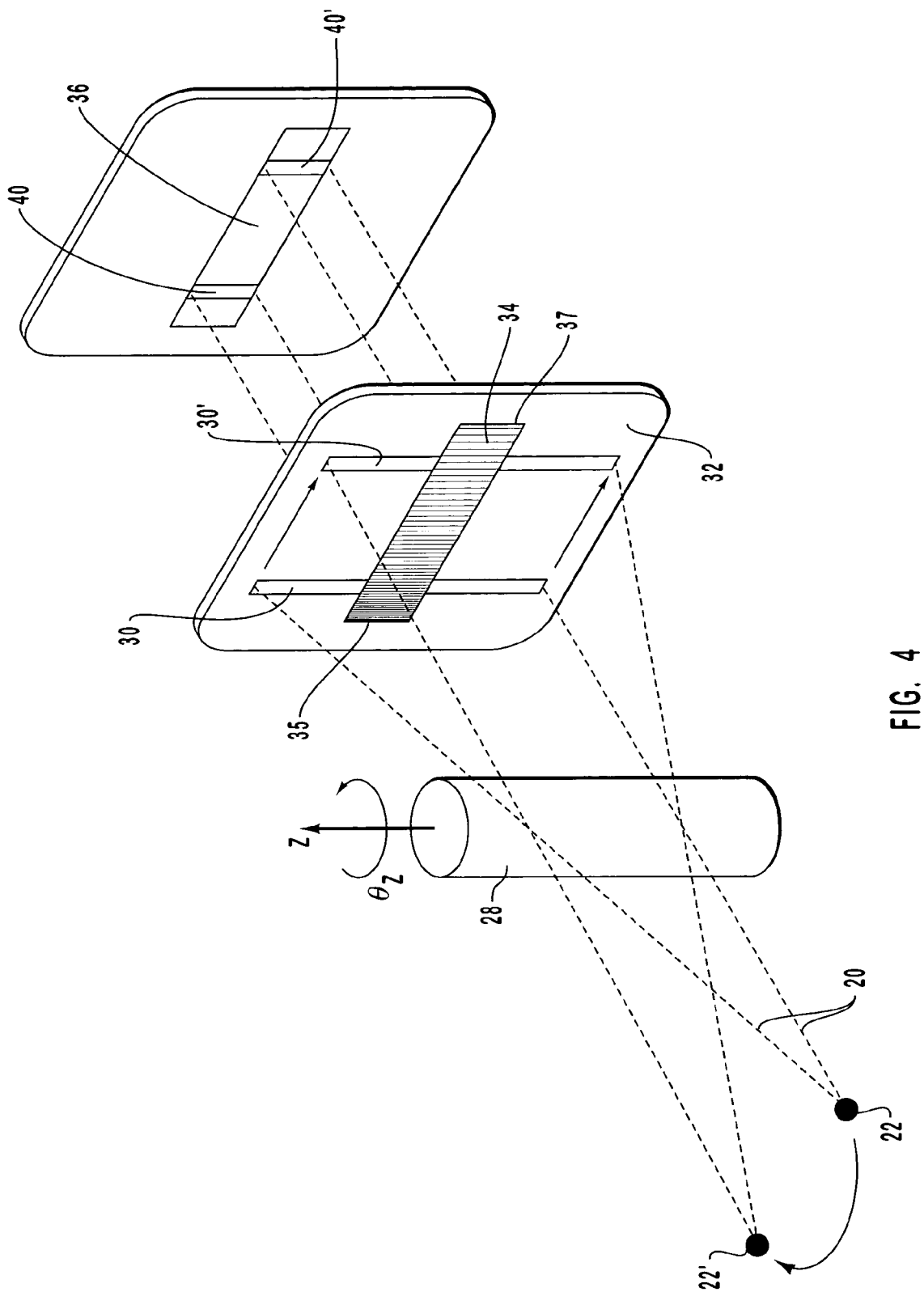
FIG. 4 is an exploded perspective view of selected components of a remote control device, including a cylindrical lens, a gradient density filter, and a detector.

As illustrated in FIG. 4, a cylindrical lens is one example of the means for selectively projecting and/or focusing the signal, and may be used to focus a portion of signal 20 in a generally linear region 30 of a filter panel 32 in the remote control device. Cylindrical lens 28 is a suitable optical device according to the invention because a properly positioned cylindrical lens 28 focuses substantially parallel rays in a generally linear region that has a longitudinal axis parallel to the cylindrical axis of the cylindrical lens 28. It is recognized that cylindrical lenses generally do not tightly focus all light passing therethrough to a very narrow linear region. For example, light passing through the far left or the far right region of cylindrical lens 28 of FIG. 4 may be refracted and projected outside of the generally linear region 30. However, cylindrical lens 28 focuses light passing therethrough at a significantly higher intensity on linear region 30 than the adjacent regions.

FIG. 4 also illustrates the manner in which the projected image generated by cylindrical lens 28 at the generally linear region 30 is translated across filter panel 32 as the remote control device is rotated about the Z axis. In particular, the image shifts to a second generally linear region 30' and retains a longitudinal axis parallel with the cylindrical axis of cylindrical lens 28.

As seen in FIG. 4, this embodiment of the remote control devices of the invention further includes an optical filtering structure that selectively removes a portion of the electromagnetic radiation from projected signal 20 depending on the angular position of the remote control device about the Z axis. As used herein, "filtering structure" is intended to extend to any structure that permits a varying amount of electromagnetic radiation from a signal to reach a detector, depending on the angular position of the remote control device. The physical processes used by "filtering structures" include, but are not limited to, projection, absorption, focusing, reflection, refraction, and combinations of the foregoing. Moreover, a filtering structure may also include a selected shape, dimension, or configuration of a detector itself, such that the detector receives varying amounts of a signal as the remote control device is rotated. Any of the filtering structures disclosed herein are to be understood as examples of filtering means for selectively reducing the amount of electromagnetic radiation within signal 20 in response to the angular orientation of the remote control device.

One example of a filtering structure is gradient density filter 34, which may be positioned on filter panel 32 such that the gradient axis thereof is oriented perpendicular to the cylindrical axis of cylindrical lens 28. Gradient density filter 34 progressively permits more of signal 20 to pass therethrough as the generally linear region 30 shifts along the gradient axis. For example, at a first end 35 of gradient density filter 34, little or none of signal 20 is permitted to pass therethrough. At the opposite second end 37 of gradient density filter 34, most or all of signal 20 is allowed to pass therethrough. In the segment between first end 37 and second end 38, gradient density filter 34 progressively allows a greater portion of signal 20 to pass therethrough.

In order to detect the amount of signal 20 that passes through gradient density filter 34, receiving means for receiving signal 20 is positioned therebehind. An example of the receiving means is a photosensitive detector 36 that outputs an electrical signal in response to a measured amount of electromagnetic radiation. For illustrative purposes, detector 36 is shown displaced from filter panel 32. In practice, however, detector 36 and filter panel 32 are often much closer together, and may be in direct contact. When detector 36 is used in connection with gradient density filter 34, it measures varying amounts of electromagnetic radiation depending on the angular position of the remote control device about the Z axis and the corresponding position of generally linear region 30. For example, in FIG. 4 detector 36 measures a lesser amount of electromagnetic radiation when signal 20 falls upon a first region 40 than when it falls upon a second region 40'. In this manner, the amount of radiation measured by detector 36 is a function of the angular position of the remote control device about Z axis in the sense that the measured amount of radiation predictably changes during rotation of the remote control device.

A cylindrical lens 28 and the associated gradient density filter 34 and detector 36 of FIG. 4 are an example of means for measuring a first component of the incident direction of signal 20 about one axis, which corresponds, for example, to $\theta_Z$ of FIG. 3A. Other examples of such means may include linear or planar detector arrays that include a plurality of discrete detectors and are adapted to measure angular displacement based on the relative amount of incident energy falling on each of the detectors in the array. When detector arrays are used, gradient filters and/or lenses may not be necessary, depending on the particular configuration.

Figure 5:
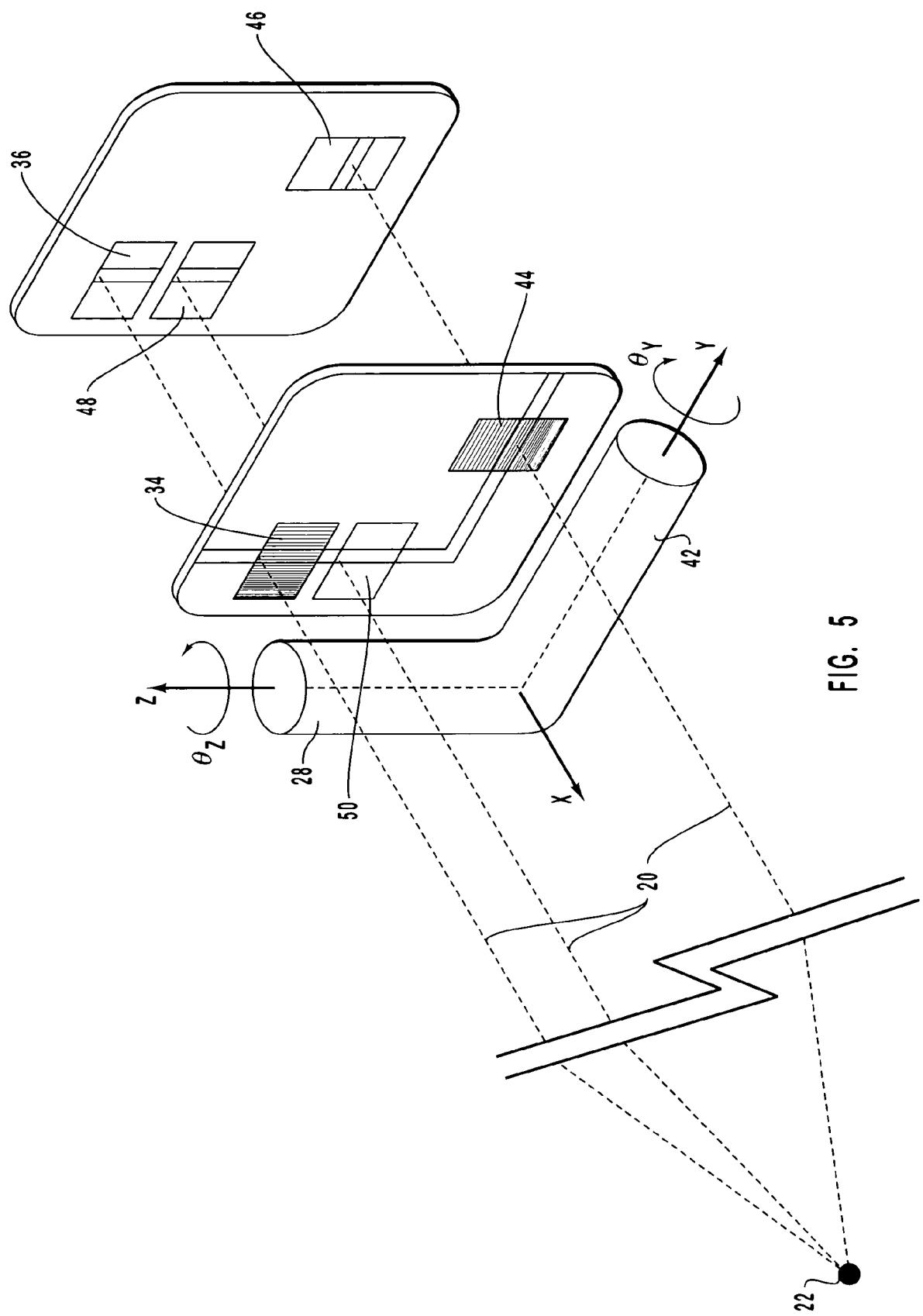
FIG. 5 is an exploded perspective view of the selected components of FIG. 4 and additionally depicts a second cylindrical lens with its accompanying gradient density filter and detector.

In order to uniquely specify the incident direction of signal 20, a second component is measured around a second nonparallel axis. FIG. 5 depicts one system for measuring the incident direction about two axes. In particular, FIG. 5 illustrates a first cylindrical lens 28 with its associated first gradient density filter and a first detector. The remote control device also includes a second cylindrical lens 42, second gradient density filter 44 and a second detector 46, which thereby constitute one example of means for measuring a second component of the incident direction of signal 20 about the Y axis. It is also to be understood that the foregoing lenses, filters and detectors are but one example of orientation means for establishing an initial angular orientation of the remote control device upon activation thereof. Moreover, the detectors disclosed herein constitute but one example of detecting means for receiving and detecting an amount of electromagnetic radiation within signal 20.

As shown in FIGS. 4 and 5, the amount of electromagnetic radiation measured by detectors 36 and 46 depends on the incident direction of signal 20 with respect to the Z and the Y axes. It can also be understood that the amount of radiation detected by detectors 36 and 46 is generally proportional to the apparent intensity of beacon 22. Thus, rotating the remote control device and changing the apparent intensity of beacon 22 may each have the same effect on detectors 36 and 46. One way in which the apparent intensity of beacon 22 may change, perhaps unintentionally, is increasing or decreasing the distance between the remote control device and beacon 22.

In order to compensate for the effects of a possible change in the apparent intensity of beacon 22, the remote control devices of the invention may include at least one intensity detector 48. In FIG. 5, intensity detector 48 is accompanied by an optical filter 50 that permits a uniform proportion of signal 20 to pass therethrough regardless of the incident direction of signal 20. The output of detector 48 may be used to normalize the outputs of detectors 36 and 46 in order to eliminate the variability introduced by changes of the apparent intensity of beacon 22. For example, the output of detector 36 may be divided by the output of detector 48 in order to yield a ratio that uniquely defines the incident direction of signal 20 measured about the Z axis, regardless of the apparent intensity of beacon 22.

There are other ways to normalize the signals generated by detectors 36 and 46 or to otherwise eliminate the variability caused by changes in the apparent intensity of beacon 22. For example, in FIG. 6, first cylindrical lens 28 is accompanied by a first gradient density filter 34 and an opposing second gradient density filter 52. The gradient density filters are opposing in the sense that the gradient axis of second gradient density filter 52 is rotated about 180° from the gradient axis of filter 34. This configuration of filters provides that, regardless of the apparent intensity of beacon 22, the ratio of the output of detector 36 to the output of detector 54 uniquely specifies the incident direction of signal 20 measured about the Z axis.

In a further alternative method of normalizing the detector output, each cylindrical lens of FIG. 5 may be accompanied by one intensity detector 48. Moreover, other combinations of the optical structures disclosed herein can be used to identify the apparent intensity of beacon 22 and to normalize the output of the detectors with respect thereto.

Figure 7:
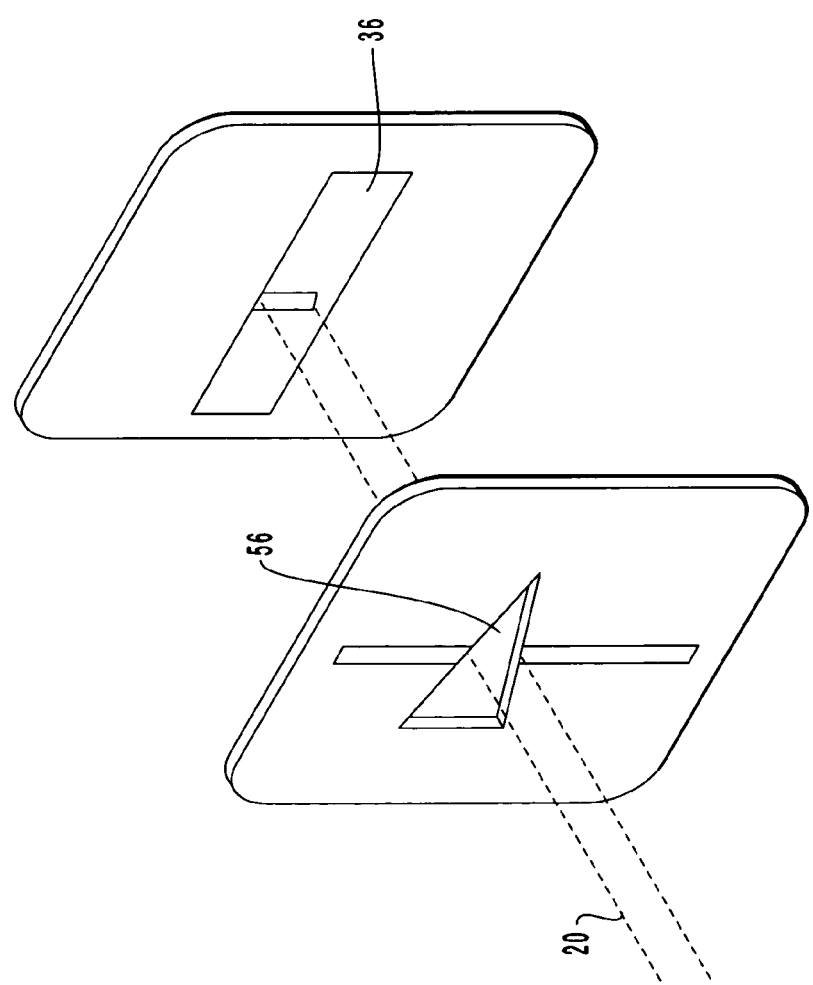
FIG. 7A is an exploded perspective view of a tapered opening that selectively permits a signal to reach a detector.
FIG. 7B is an exploded perspective view of selected components of a remote control device depicting a tapered mask that selectively permits a signal to reach a detector.

FIGS. 7A and 7B illustrate alternative structures that correspond to the filtering means of the invention. For example, in FIG. 7A, a wedge shaped opening 56 is formed in a mask 57 that otherwise covers detector 36. Depending on the position at which signal 20 falls upon wedge shaped opening 56, a varying amount of signal 20 is measured by detector 36. Likewise, FIG. 7B depicts a wedge shaped masking structure 58 that overlies a portion of detector 36 in order to selectively absorb a portion of signal 20 depending on the incident direction thereof. Of course, other filtering structures such as reflective or refractive devices may be used to selectively remove radiation from signal 20. For example, a tapered reflective surface may be positioned to selectively reflect signal 20 onto an associated detector.

The means for measuring the first component of the angular displacement of the remote control device and the means for measuring the second component of the angular displacement may alternatively use structures other than the filtering structures disclosed herein. For example, the filtering structures may be replaced with a mask or grating that is striped or otherwise patterned so as to produce a countable pulse as the remote control device is rotated. Another option includes using a binary-encoded mask and a number of detectors, one per bit, that allows digital detection of the angular orientation of the remote control device to a finite precision. However, the foregoing alternatives are typically more expensive and difficult to implement than embodiments using filtering structures.

Figure 6:
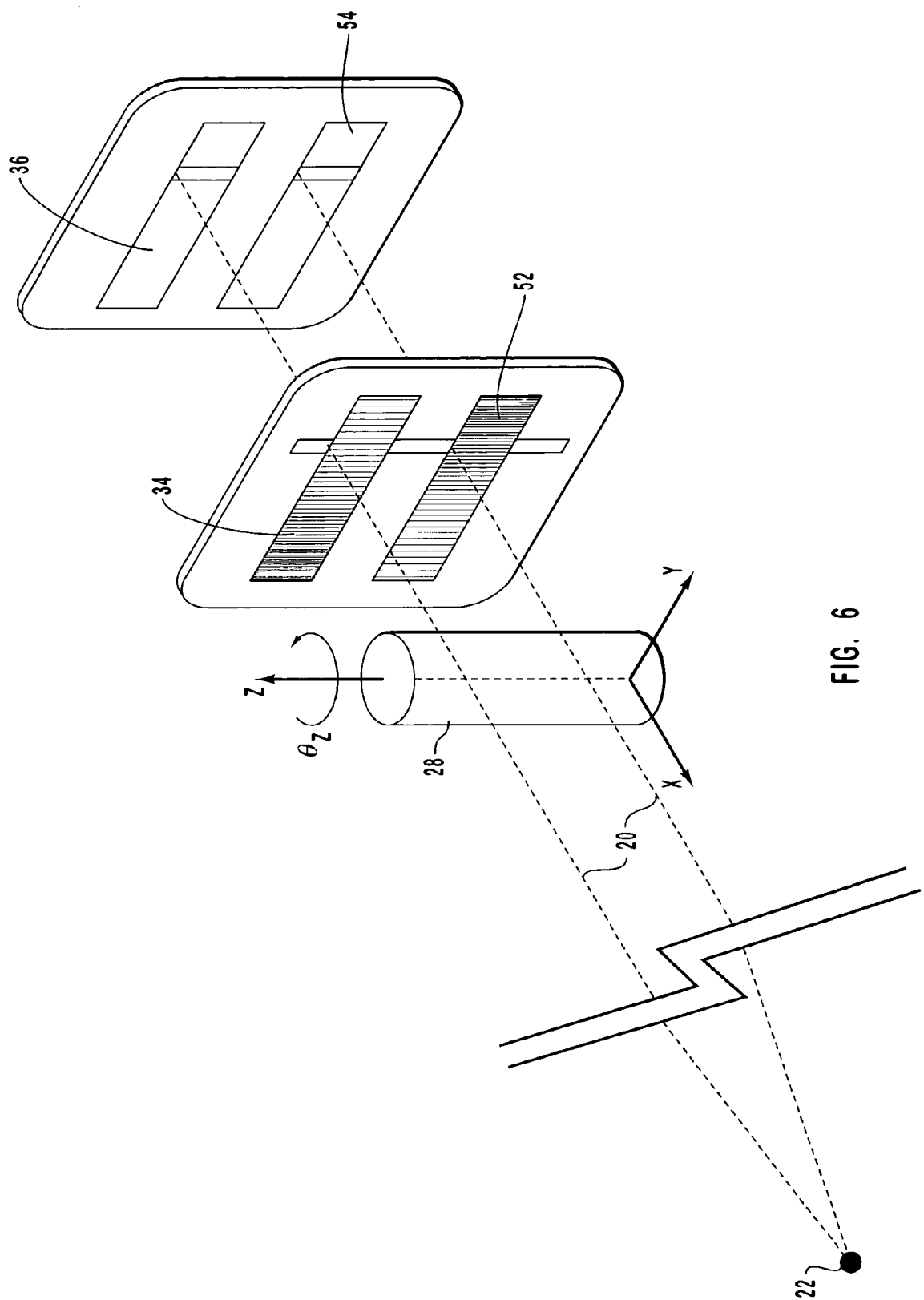
FIG. 6 is an exploded perspective view of selected components of the remote control device, including a first gradient density filter and a second gradient density filter rotated 180° with respect to each other.

In another embodiment of the invention, the cylindrical lenses of FIGS. 4 and 5 are replaced with other structures for selectively projecting signal 20 onto a surface. For example, the means for selectively projecting and/or focusing a portion of signal 20 may include a first elongated opening 58 and a second non-parallel elongated opening 60. Such elongated openings may be used to project a portion of signal 20 onto generally linear regions 62 and 64. While at least some of signal 20 is usually diffracted while passing through elongated openings 58 and 60 and is thereby projected on filter panel 34 outside of the generally linear regions 62 and 64, the configuration of FIG. 8 generates a region of maximum intensity within generally linear regions 62 and 64 that is sufficiently predictable to be used with the invention. Therefore, components of the incident direction of signal 20 about the Y axis and the Z axis may be uniquely identified by using detectors positioned behind gradient density filters 34 and 44. Of course, the output of the detectors may need to be normalized with respect to the apparent intensity of beacon 22 in much the same manner as illustrated in FIG. 5 or 6.

Figure 8:
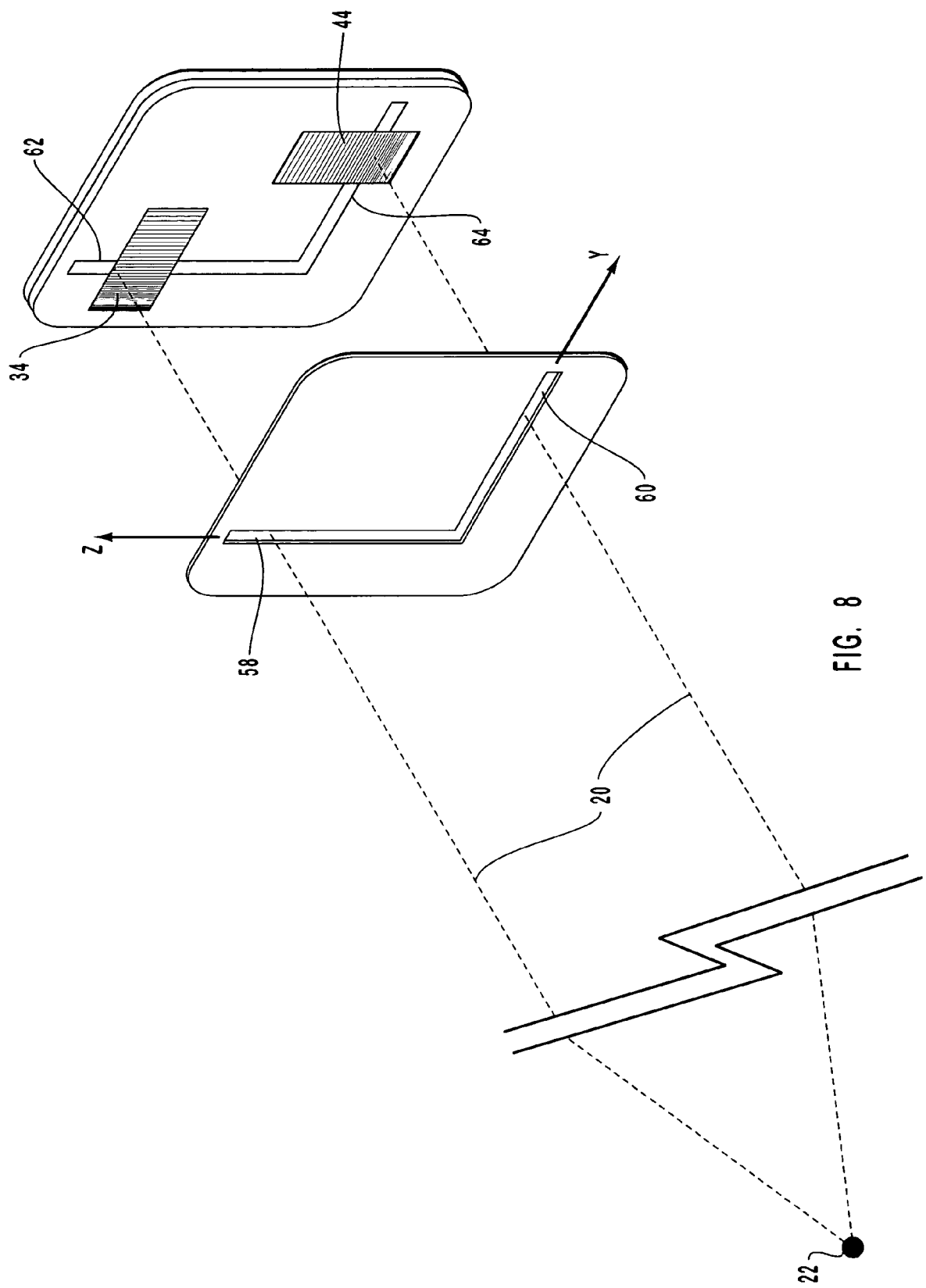
FIG. 8 is an exploded perspective view of selected components of a further embodiment of a remote control device according to the invention. In particular, the cylindrical lenses of FIG. 5 are replaced with elongated openings.

The elongated openings, gradient density filters, and detectors of FIG. 8 are presented as alternative examples of means to measure a first component and a second component of the angular displacement of the remote control device about the Y and the Z axes, respectively. Furthermore, the entire structure illustrated in FIG. 8 is another example of orientation means for establishing an initial angular orientation of the remote control device upon activation thereof.

Figure 9A:
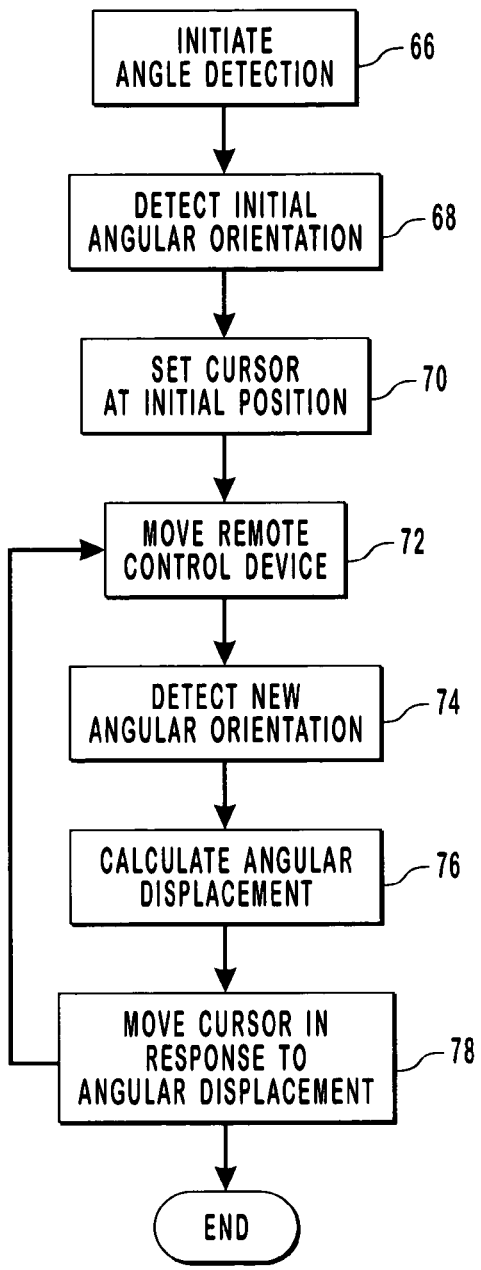
FIG. 9A is a flow diagram illustrating a method for positioning and moving a cursor according to the invention.
Figure 9B:
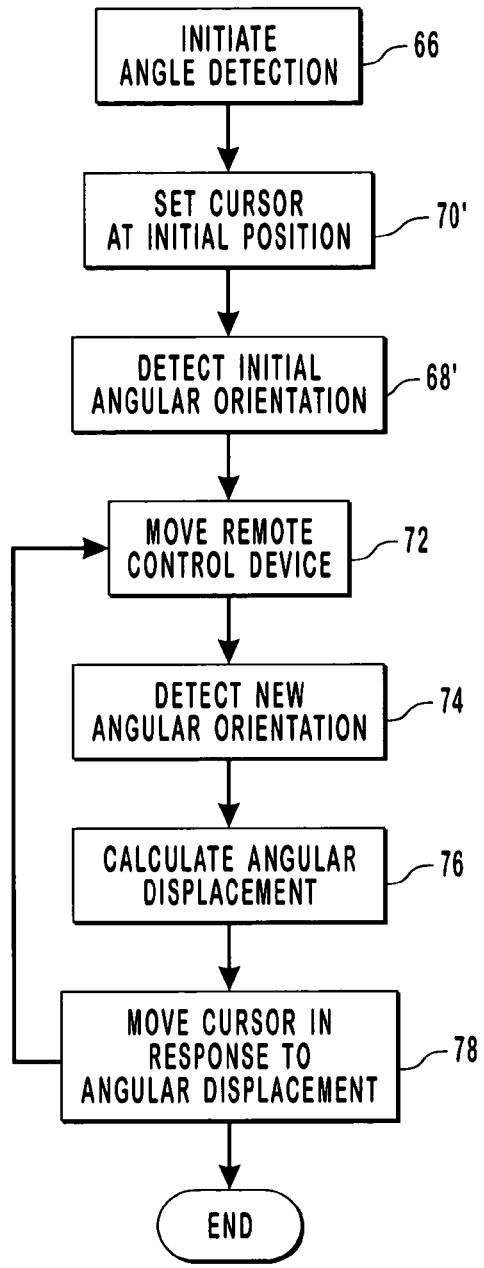
FIG. 9B is a flow diagram depicting an alternative method for positioning and moving the cursor.

FIGS. 9A and 9B are flow diagrams that set forth the manner in which the visual display system of the invention may generate and position a cursor in response to the angular orientation measurement of the remote control device. Turning first to FIG. 9A, angle detection is initiated in a first step 66 by setting the remote control device to an active state by one of any number of events. For example, a user may depress a button to indicate that a cursor is to be generated on the display screen.

Alternatively, the remote control device may be automatically activated upon being moved or pointed. This may be performed by including motion sensors within the remote control device or by other suitable means. In yet another variation, the remote control device may continually remain in an active state. This may be less preferable than other options, however, because a continually active state may require greater power requirements than are available. Because the remote control devices of the invention may be self contained units powered by batteries, it may be preferable to limit the amount of time that the remote control device is actively monitoring angular orientation in order to conserve energy resources.

After angle detection is initiated, the remote control device may detect, in step 68, the initial angular orientation according to the methods disclosed herein. The information corresponding to the initial angular orientation is transmitted to the control box, which, in step 70, sets a cursor at an initial position on the display screen. Accordingly, under the method depicted in FIG. 9A, the initial cursor position is determined by the initial angular orientation of the remote control device.

After initially positioning the cursor and detecting the angular orientation, step 72 is conducted, in which the user moves the remote control device as desired in order to move the cursor. During or after being moved, the remote control device detects the new orientation according to methods disclosed herein, as shown in step 74. The raw angular orientation information may be used in step 76 to calculate the angular displacement of the remote control device in one of at least two possible ways. First, the angular displacement may be calculated with respect to the initial angular orientation of the remote control device. Second, the angular displacement may be calculated with respect to the immediately preceding angular orientation measurement. The foregoing calculation of angular displacement may be conducted in the remote control device before information is relayed to the control box or may be performed in the control box after raw data has been transmitted from the remote control device.

The angular displacement information is used to move or reposition the cursor in step 78 according to a predetermined set of mapping rules. The user continues to move the remote control device and angular orientation information is repeatedly gathered, transmitted, and calculated in order to repeatedly move the cursor position. Typically, the visual display system of the invention uses discrete samples of the angular orientation information to move the cursor at a predetermined frequency. Finally, the user may discontinue movement of the remote control device after the cursor has been moved to a desired location on the display screen or may deactivate the remote control device, thereby terminating the process of moving the cursor.

FIG. 9B sets forth a variation of the method described in FIG. 9A. In particular, the order of the steps 68 and 70 of FIG. 9A are reversed and may be modified as well. Thus, in FIG. 9B, step 66 is followed by step 70', in which the initial position of the cursor is set. It should be noted that step 70' of FIG. 9B involves setting the cursor position independent of the initial angular orientation of the remote control device. The cursor may be positioned on the display screen at a predetermined location, such as the center of the screen, any other location on the screen, or the position at which the cursor was located at the time the remote control device was last deactivated. Moreover, the cursor may be set to any predetermined active region of a computer-generated display on the display screen independent of the initial position of the remote control device.

The process of FIG. 9B further includes, in step 68', detecting the initial angular orientation of the remote control device after the initial cursor position is set. The initial remote control orientation may then be associated with the already-selected initial cursor position. Subsequent motion of the remote control device and measurement of the resultant angular orientation may be referenced to the initial angular orientation and initial cursor position in steps 72, 74, 76, and 78 in the same manner as has been described above in reference to FIG. 9A.

Figure 10:
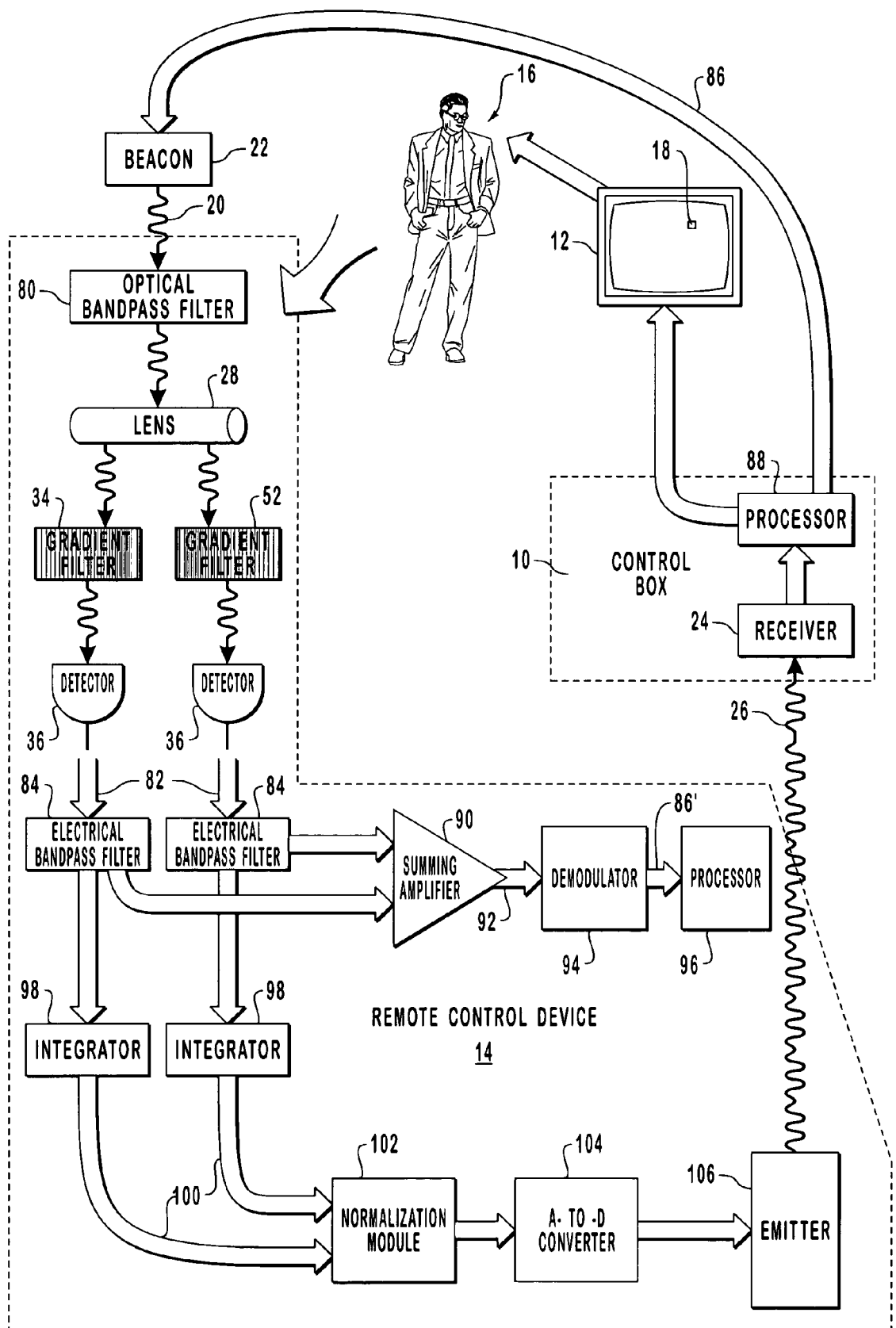
FIG. 10 is a schematic diagram of components of a visual display system according to the invention.

FIG. 10 illustrates the movement and processing of information and electrical and electromagnetic signals within a remote control device and an associated visual display system of the invention. It should be understood that the system and method of FIG. 10 are presented by way of example, and that other systems and methods, including alternatives disclosed herein, may be used according to the invention. As disclosed herein, beacon 22 emits signal 20 which is received by remote control device 14. In order to at least partially reduce interference with signal 20 caused by background sources of radiation, signal 20 passes through an optical bandpass filter 80 that selectively permits signal 20 to pass therethrough. Optical bandpass filter 80 may include a coating on a surface substantially transparent to the desired wavelengths. The surface may be on remote control device 14 or may instead be positioned directly on substantially cylindrical lens 28.

After passing through optical bandpass filter 80, signal 20 passes through substantially cylindrical lens 28 and is projected onto a first gradient density filter 34 and an opposing second gradient density filter 52 as depicted in FIG. 6. Next, the filtered signal falls upon detectors 36, which convert incident energy into an electrical current according to methods known in the art. Alternatively, any other suitable configuration of lenses, filters, detectors, or other suitable structures may be used, including those of FIGS. 5, 7A, 7B and 8.

Cylindrical lens 28, gradient density filters 34 and 52, and detectors 36 are sufficient to provide data relating to the angular orientation of the remote control device about one axis. For purposes of illustration, FIG. 10 depicts the foregoing elements as they relate to only to one measurement channel, or one of the two non-parallel axes of measurement. As has been described in reference to FIG. 5, the remote control device may further include a second cylindrical lens, one or more additional gradient density filters, and one or more additional detectors in a second measurement channel. The foregoing additional elements are not depicted in FIG. 10, but are used in order to measure the angular orientation of the remote control device about a second non-parallel axis.

Beacon 22 may amplitude modulate signal 20 at a selected frequency in order to further distinguish signal 20 from background sources of radiation. The modulation of signal 20 typically causes electrical signals 82 produced by detectors 36 to have a corresponding frequency. Electrical signals 82 are passed through a bandpass filter 84 selected to further reduce interference caused by background sources of radiation by suppressing frequencies other than the frequency of electrical signals 82.

Optionally, information is encoded in signal 20 in order to allow instructions 86 to be transmitted from processor 88 of control box 10 to remote control device 14. Instructions 86 may be used in any desired manner to modify or control selected functions of remote control device 14. If information is encoded in signal 20, a suitable method of decoding the information includes combining and amplifying the filtered signals passing through bandpass filters 82 using a summing amplifier 90 according to known methods. Summing and amplifying the filtered electrical signals ensures that sufficiently strong signals are available regardless of the portion of gradient density filters 34 and 52 that are used. The amplified signal 92 is then transmitted to a demodulator 94 to decode instructions 86. In this manner, instructions 86' may be used by a processor 96 in remote control device 14 or in any other desired manner.

The filtered signals that have passed through bandpass filters 84 are also directed to integrators 98 that generate integrated signals 100. Normalizing module 102 receives the integrated signals 100 and performs a division operation therebetween. The quotient generated by normalizing module 102 uniquely specifies the incident direction of signal 20 with respect to the cylindrical axis of substantially cylindrical lens 28. Thus, normalization module is but one example of normalization means for adjusting the output of the detectors to substantially compensate for changes in the apparent intensity of signal 20. Normalization module 102 may be used whether the system for detecting the apparent intensity involves using opposing gradient density filters as shown in FIG. 10, one or more apparent intensity detectors 48 of FIG. 5, or suitable equivalent methods.

An analog-to-digital converter 104 receives the output of normalization module 102 and converts the output to a digital signal. Emitter 106 converts the digital signal to a corresponding electromagnetic signal that is preferably selected from the infrared region of the spectrum or, alternatively, from the radio frequency or another suitable region. Thus, emitter 106 is but one example of transmitting means for sending data to control box 10. Alternatively, the transmitting means may include a cable that electronically connects remote control device 14 with control box 10.

The operations performed by the normalization module 102 may be alternatively conducted within processor 88 of control box 10. This could be accomplished by transmitting the raw data generated by detectors 36 from emitter 106 to control box 10 without any intermediate processing steps, or only with an analog-to-digital conversion at converter 104. Of course, conducting the normalization process in processor 88 reduces the required processing capabilities of remote control device 14, thereby possibly reducing its energy requirements. At the same time, however, transmitting raw data from remote control device 14 may require more data streams, one per detector 36, to be sent to the control box 10 than would be necessary if normalization had been already conducted. The optimal method may depend on the particular configuration of remote control device 14 and control box 10, and the relative distribution of resources therebetween.

Data 26 that is sent from remote control device 14 is received by a receiver 24 on control box 10. Data 26 is then relayed to processor 88 which includes circuitry and/or executable code that translates data 26 into movement of cursor 18 on display screen 12. Methods for using a processor to move a cursor in response to positional data from an input device are well-known in the art.

Using the foregoing methods, a user 16 is able to view the position and movement of cursor 18 and to rotate or otherwise move remote control device 14 in order to cause cursor 18 to move to a desired position. The hand-eye feedback loop employed by user 16 in order to selectively position cursor 18 is relatively intuitive when using the input devices according to the invention. In particular, the pointing actions and gestures used to manipulate remote control 14 are universally understood and are easily adapted by a person learning to use the remote control devices.

Figure 11:
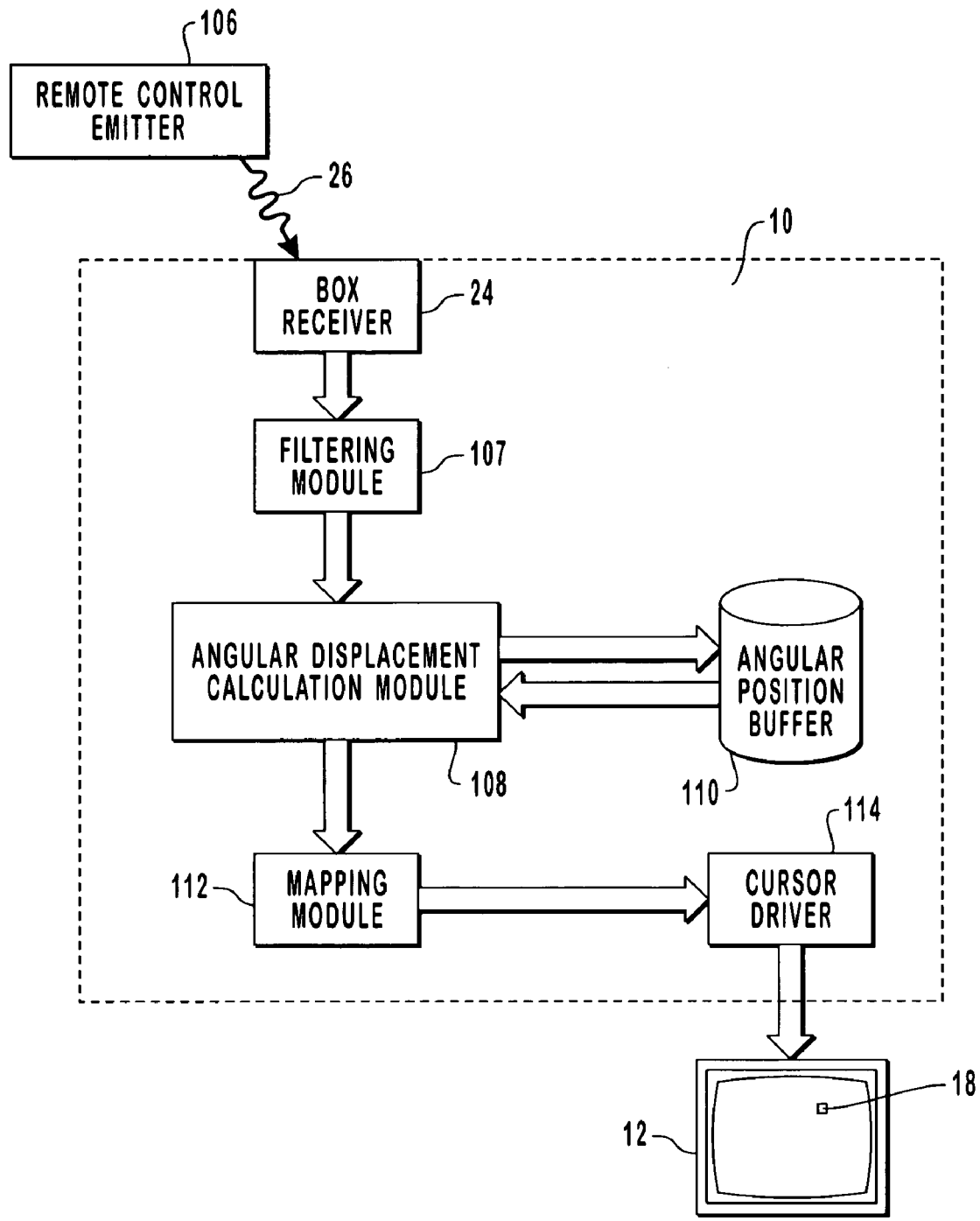
FIG. 11 is a schematic diagram of a control box used to position a cursor according to the invention.

FIG. 11 illustrates in greater detail but one example of the functional components of a control box 10 according to the invention. The functions of control box 10 depicted in FIG. 11 may be executed using the architecture of control box 10 depicted in FIG. 2, or by means of any other suitable circuitry and/or executable code. It should be recognized that the functional components of control box 10 depicted in FIG. 11 are primarily conceptual, and represent separate functions that may be performed by using hardware and/or software.

After data 26 is transmitted from emitter 106 to receiver 24, the data optionally passes through a filtering module 107, which may be advantageously included in control box 10 in order to at least partially eliminate the effects of unintended jitter or other small motion noise that would otherwise prevent smooth motion of the cursor. It can be understood that a remote control device unavoidably experiences unintended motion while being manually pointed and moved. For example, a user is unlikely to be able to hold a remote control device in a precisely fixed position or to rotate the remote control device through a perfectly smooth path. As a result, small deviations from the desired position of the remote control device are likely to be continually introduced into the system, and the data transmitted from the remote control device exhibits the equivalent of noise which represents the unintended movement. The noise is generally at a high frequency compared to the movement of the cursor.

To at least partially eliminate the noise introduced into the transmitted data, filtering module may include devices that provide spatial and/or temporal filtering of the motion of the remote control device. A temporal low-pass filter may be used to suppress high-frequency components of the signals, thereby at least partially compensating for natural motor jitter. Such filters are well known in the art and include the so-called alpha filter and the alpha-beta filter. Other filtering algorithms may also be used. Moreover, a spatial low-pass filter can be used to improve the smoothness of motion represented on the display screen. For example, if the invention is used in a drawing application on the display screen, a spatial low-pass filter may enhance the smoothness of the lines and curves made by the user. It can be understood that the filtering devices are more effective when directed to unintended motion that is relatively small, or that has a magnitude less than a preselected threshold value.

In certain circumstances, the filtering module may be used to replace the normalization module 102 of FIG. 10. As previously disclosed, in the absence of a normalization module 102, changes in the apparent intensity of signal 20 are equivalent, from the standpoint of detectors 34 and 52, to rotation of the remote control device. If the changes in apparent intensity are sufficiently small, however, such changes may be perceived by detectors 34 and 52 in the same way that motion jitter is perceived. For example, moving the remote control device slightly closer to or further away from beacon 22 introduces noise into the transmitted signals in much the same way as unintentional rotation. Depending on the magnitude of the changes of the apparent intensity and the configuration of the filtering devices, the resulting irregularities in the transmitted data may be effectively reduced or eliminated using filtering module 107.

An alternative solution for at least partially eliminating the effects of unintended movement does not require filtering devices. Instead, angular displacement module 108, mapping module 112, or another suitable element of control box 10 may be adapted to move cursor 18 only when the angular displacement of remote control device 14 has changed more than a minimum value. Thus, if a first sample and a second sample of the angular displacement differ one from another by less than a minimum value, the minimal change is considered to be caused by unintentional movement, and the cursor is not moved. On the other hand, when the angular displacement changes by a larger amount, which is unlikely to be the result of unintentional movement, the cursor is repositioned. This also has the effect of suppressing jitter on the signal.

After the optional step of filtering, the angular displacement calculation module 108 successively receives discrete sets of data corresponding to the angular orientation measured by the remote control device. Module 108 then compares the most recent set of data with previous angular position data stored in angular position buffer 110. The angular position data stored in buffer 110 may be updated with each new set of data received by control box 10 or may instead include the initial angular orientation of the remote control device that was detected upon activation of the system. In this manner, angular position buffer 110 is but one example of means for storing data relating to a reference angular orientation of the remote control device, and module 108 is but one example of means for comparing the reference angular orientation to the new angular orientation.

After module 108 determines the most recent angular displacement, this information is transmitted to a mapping module 112, which is but one example of means for selecting a cursor position on the display screen in response to the angular movement of the remote control device. For example, a predetermined set of mapping rules may be accessible to mapping module 112 and may be used to translate the angular displacement information into a corresponding position of cursor 18. The mapping information is sent to a cursor driver 114 that, in combination with display screen 12, generates an updated position of cursor 18 according to methods that may be well-understood in the art.

Alternatively, much of the processing of data 26 that is hereby depicted in control box 10 may be instead conducted in the remote control device. However, it may be preferable to conduct a large proportion of the data processing in control box 10 so as to conserve energy resources of the remote control device.

In order to overcome the foregoing feature of the remote control devices, two beacons 22 may be used in order to emit two signals 20 to the remote control device 14. It can be understood that using two beacons 22 and one remote control device 14 is conceptually equivalent to defining three non-collinear points, which is sufficient to define a plane. In this manner, the defined plane may be detected by remote control device 14 and may be used as a fixed reference such that rotation of remote control device 14 in a horizontal plane corresponds to movement of cursor 18 in the Y' direction, regardless of the angular position of the remote control device with respect to the X axis.

The principles disclosed herein may be readily used to support two or more simultaneously-used remote control devices. This may allow two or more users to concurrently provide input to control box 10 and to generate concurrent selected functions on display screen 12. This may be desirable in order to support interactive computer games on a television screen or any other computer applications in which concurrent users may be desired.

The present invention may be embodied in other specific forms without departing from its spirit or essential characteristics. The described embodiments are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a display system that comprises a display screen, a processor for controlling use of the display screen to display information, and a hand held remote control device for communicating user input to the processor, a method of positioning a cursor on the display screen, the method comprising:

emitting a signal from a first location to a remote control device at a second location, wherein the signal has an incident direction at the second location;

receiving from the remote control device, data corresponding to an angular displacement between the incident direction of the emitted signal and at least one selected axis of the remote control device;

using one or more mapping functions or rules to map the received data corresponding to angular displacement of the remote control device into movement of the cursor, wherein said mapping functions or rules are dynamically modified or selected based on (i) a particular computing task a user is performing, or (ii) a particular region of the display screen to which user input is directed; and positioning the cursor on the display screen in response to the mapped data.

2. A method as defined in claim 1, further comprising filtering the transmitted data to at least partially prevent the cursor from being position on the display screen in response to unintentional movement of the remote control device, wherein the unintentional movement has a magnitude less than a preselected threshold value.

3. A method as defined in claim 1, further comprising selecting a scale factor such that movement of the cursor is selectively proportional to a unit change of the angular displacement.

4. A method as defined in claim 3, wherein selecting a scale factor comprises detecting an angle subtended by the display screen from the point of view of the remote control device, and adjusting the scale factor proportionally to the subtended angle.

5. A method as defined in claim 1, further comprising the remote control device:

receiving the emitted signal;

detecting an angular displacement between the incident direction of the signal and the at least one selected axis of the remote control device; and transmitting the data corresponding to the angular displacement.

6. A method as defined in claim 2, wherein the filtering is part of a mapping function.

7. A method as defined in claim 3, wherein selecting a scale factor is part of a mapping function.

8. A method as defined in claim 5, further comprising repeatedly:

moving the remote control device to establish a new angular displacement between the incident direction of the signal and the at least one selected axis of the remote control device;

detecting the new angular displacement;

transmitting data corresponding to the new angular displacement to the processor;

using the one or more mapping functions or rules to map the data received from the remote control device; and positioning the cursor on the display screen in response to the mapped data.

9. A method as defined in claim 5, wherein the step of detecting the angular displacement between the incident direction of the signal and the at least one selected axis of the remote control device comprises detecting a first component of the angular displacement about a first axis and further detecting a second component of the angular displacement about a second axis that is non-parallel to the first axis.

10. A method as defined in claim 5, wherein receiving the signal with the remote control device comprises projecting the signal through at least one lens.

11. A method as defined in claim 5, wherein receiving the signal with the remote control device comprises projecting the signal through at least one elongated opening in the remote control device.

12. A method as defined in claim 1, wherein positioning the cursor on the display screen is independent of the angular position of the remote control device about its central axis.

13. A method as defined in claim 1, wherein emitting the signal comprises at least one of modulating the signal and encoding data into the signal.

14. A method as defined in claim 1, wherein the signal is emitted from the first location to a plurality of remote control devices, the method further comprising:

receiving from each of the plurality of remote control devices, data corresponding to the angular displacement between the incident direction of the emitted signal and at least one selected axis of each remote control device; and generating one or more user input functions on the display screen in response to the data received from each of the plurality of remote control devices.

15. A moveable remote control device for use in a display system that includes a display screen and a processor electronically connected to the display screen, the moveable remote control device transmitting to the processor angular orientation information of the moveable remote control device so that a selected user input function may be generated on the display screen, the remote control device comprising:

receiving means for receiving an electromagnetic signal emitted from a remote location;

orientation means for establishing an initial angular orientation of the remote control device, data corresponding to the initial angular orientation being transmitted from the remote control device to the processor;

first means for measuring a first component of an angular displacement of the remote control device about a first axis and relative to the initial angular orientation;

second means for measuring a second component of the angular displacement of the remote control device about a second axis and with respect to the initial angular orientation, the second axis being non-parallel with the first axis;

mapping means for translating movement data for the remote control device corresponding to the first component and the second component of the angular displacement into at least cursor movement data, wherein said mapping means are dynamically modified or selected based on either (i) a particular computing task a user is performing, or (ii) a particular region of the display screen to which user input is directed; and transmitting means for sending the cursor positioning data to the processor.

16. A remote control device as defined in claim 15, wherein the receiving means comprises means for selectively projecting a portion of the electromagnetic signal onto a surface of the remote control device.

17. A remote control device as defined in claim 16, wherein the means for selectively projecting a portion of the electromagnetic signal comprises a first substantially cylindrical lens having a first longitudinal axis and a second substantially cylindrical lens having a second longitudinal axis that is non-parallel with the first longitudinal axis.

18. A remote control device as defined in claim 15, wherein the first means and the second means each comprises filtering means for selectively reducing the amount of electromagnetic radiation within the signal in response to the angular orientation of the remote control device.

19. A remote control device as defined in claim 18, wherein the filtering means comprises a gradient density filter.

20. A remote control device as defined in claim 18, wherein the filtering means comprises a first gradient density filter and a second gradient density filter oriented at about 180° with respect to the first gradient density filter.

21. A remote control device as defined in claim 18, wherein the filtering means operates using one or more of the physical processes selected from the group consisting of projection, absorption, focusing, reflection, refraction, and combinations of the foregoing.

22. A remote control device as defined in claim 16, wherein the means for selectively projecting a portion of the electromagnetic signal comprises an elongated opening in the remote control device.

23. A remote control device as defined in claim 15, wherein the first means and the second means each comprises detecting means for receiving and detecting an amount of electromagnetic radiation within the electromagnetic signal.

24. A remote control device as defined in claim 15, further comprising means for decoding instructions that are encoded in the electromagnetic signal.

25. A remote control device as defined in claim 24, wherein the means for decoding instructions comprises a summing amplifier and a demodulator.

26. A remote control device as defined in claim 24, further comprising processor means for executing decoded instructions.

27. A remote control device as defined in claim 15, further comprising means for setting the remote control to an active state.

28. A remote control device as defined in claim 15, further comprising normalization means to compensate for changes in the apparent intensity of the signal.

29. A computer input system for generating a selected user input function on a display screen based on user interaction with a remote control device, the computer input system comprising:
    emitter means for emitting a signal from a first location to a remote control device at a second location, wherein the signal has an incident direction at the second location;
    receiver means for receiving from the remote control device, data corresponding to an angular displacement between the incident direction of the emitted signal and at least one selected axis of the remote control device;
    mapping means for translating the received data corresponding to angular displacement into cursor movement data, wherein said mapping means are dynamically modified or selected based on either (i) a particular computing task a user is performing, or (ii) a particular region of the display screen to which user input is directed; and
    processor means for generating the selected user input function on the display screen in response to the mapped data.

30. A computer input system as defined in claim 29, comprising:
    means for storing data relating to a reference angular displacement of the remote control device; and
    means for comparing the reference angular displacement to the received angular displacement data, whereby an angular movement of the remote control device is determined.

31. A computer input system as defined in claim 29, wherein the mapping means includes means for applying a scale factor to the received data such that movement of the cursor is selectively proportional to a unit change of the angular displacement.

32. A computer input system as defined in claim 29, further comprising means for filtering the transmitted data to at least partially prevent the selected user input function from being generated on the display screen in response to unintentional movement of the remote control device.

33. A computer input system as defined in claim 32, wherein the means for filtering is within the mapping means.

34. A computer input system as defined in claim 32, wherein the means for filtering performs at least one of temporal and spatial filtering.

35. A computer input system as defined in claim 29, wherein the computer input system includes one or more remote control devices, and wherein each individual remote control device comprises:
    receiver means for receiving the emitted signal;
    orientation means for establishing an initial angular orientation of the individual remote control device;
    first means for repeatedly detecting a variable first component of the angular displacement of the individual remote control device relative to the initial angular orientation by detecting the incident direction of the emitted signal, wherein the first component of the angular displacement is measured about a first axis;
    second means for repeatedly detecting a variable second component of the angular displacement of the individual remote control device by detecting the incident direction of the emitted signal, wherein the second component is measured about a second axis that is non-parallel with the first axis; and
    transmitting means for sending data corresponding to the first component and the second component of the angular displacement.

36. A computer input system for generating a selected user input function on a display screen based on user interaction with a remote control device, the computer input system comprising:
    an emitter that emits a signal from a first location to a remote control device at a second location, wherein the signal has an incident direction at the second location;
    a receiver that detects data transmitted by the remote control device, wherein the received data corresponds to an angular displacement between the incident direction of the signal and at least one selected axis of the remote control device;
    a mapping module that comprises one or more mapping functions or rules applied to the received angular displacement data when translating the received angular displacement data into cursor positioning data, wherein the mapping functions or rules are dynamically selected based on (i) a particular computing task a user is performing, or (ii) a particular region of the display screen to which user input is directed; and
    a processor that generates the selected user input function on the display screen in response to the mapped data.

37. A computer input system as defined in claim 36, further comprising:
    an angular position buffer that stores a reference angular displacement of the remote control device; and an angular displacement calculation module that compares the reference angular displacement to the received angular displacement data, whereby an angular movement of the remote control device is determined.

38. A computer input system as defined in claim 37, wherein the selected user input function comprises a cursor positioning function, and wherein a cursor position on the display screen is determined by the angular movement of the remote control device.

39. A computer input system as defined in claim 38, wherein the mapping module includes a scale factor that is applied to the received data such that movement of the cursor is selectively proportional to a unit change of the angular displacement.

40. A computer input system as defined in claim 36, further comprising a filtering module that filters the transmitted data to at least partially prevent the selected user input function from being generated on the display screen in response to unintentional movement of the remote control device.

41. A computer input system as defined in claim 40, wherein the filtering module performs at least one of temporal and spatial filtering.

42. A computer input system as defined in claim 36, wherein the computer input system includes one or more remote control devices, and wherein each individual remote control device comprises:

a first detector that repeatedly detects a variable first component of the angular displacement of the individual remote control device relative to an initial angular orientation by detecting the incident direction of the emitted signal, wherein the first component of the angular displacement is measured about a first axis;

a second detector that repeatedly detects a variable second component of the angular displacement of the individual remote control device by detecting the incident direction of the emitted signal, wherein the second component is measured about a second axis that is non-parallel with the first axis; and a remote control device emitter that sends data corresponding to the first component and the second component of the angular displacement to the receiver.

* * * * *